United States Patent [19]
Känsäkoski et al.

[11] Patent Number: 5,214,687
[45] Date of Patent: May 25, 1993

[54] METHOD TO DETERMINE TRANSMISSION QUALITY

[75] Inventors: Antti Känsäkoski; Markku Hiltunen, both of Oulu, Finland

[73] Assignee: Nokia Mobile Phones Ltd., Salo, Finland

[21] Appl. No.: 711,623

[22] Filed: Jun. 5, 1991

[51] Int. Cl.$^5$ .............................................. H04B 7/00
[52] U.S. Cl. .................................... 379/60; 371/5.1; 455/33.1
[58] Field of Search ................ 379/1, 63, 60; 371/5.1; 455/33

[56] References Cited

U.S. PATENT DOCUMENTS

| | | | |
|---|---|---|---|
| 5,067,171 | 11/1991 | Kawano | 379/60 |
| 5,142,695 | 8/1992 | Roberts et al. | 379/60 |

FOREIGN PATENT DOCUMENTS 472175A 2/1992 European Pat. Off. ............. 371/5.1

*Primary Examiner*—Stafford Schreyer
*Attorney, Agent, or Firm*—Darby & Darby

[57] ABSTRACT

A method determines the transmission quality of a signal transmitted by a base station and received by a mobile station in a cellular digital radio telephone network. The mobile station determines the phase error of detected bits a the input of the channel decoder, calculates the average and variance of the phase error. The average and variance are used to calculate the S/N ratio. The S/N ratio information is transmitted to a base station which converts the S/N ratio to a value defining the BER estimate of the received signal.

11 Claims, No Drawings

METHOD TO DETERMINE TRANSMISSION QUALITY

BACKGROUND OF THE INVENTION

The present invention relates to a method to determine the transmission quality of a signal transmitted by a base station and received by a mobile station in a cellular digital radio telephone network.

In cellular radio telephone networks a mobile station, e.g., a radio telephone to a car, is connected to the closest base station of the base station providing the best transmission quality. When the transmission quality drops below a predetermined acceptable level, the controlling exchange in the network will hand-off the mobile station to another base station providing a better transmission quality.

The various digital cellular systems (e.g. European GSM system and the US digital mobile telephone network) each have standardized criteria for determining the lowest different acceptable transmission level before a hand-off is triggered. The bit error rate (BER) of the signal received in the mobile station is the most common criteria. This BER value should then be transmitted to the respective base station in a channel quality message.

The bit error rate is conveniently determined (or measured) at the input to the decoder, i.e., the BER is determined before decoding, but after the digital signal has been received, demodulated, filtered and detected.

For example, the BER could be determined by an encoding-decoding method, where a received data frame is decoded and error corrected and then encoded and compared to the actually received frame. An estimate of the number of bit errors is provided by counting the number of unequal bits in the frames. This method is effective, but complicated to implement.

SUMMARY OF THE INVENTION

The object of the invention is to provide a method for quickly and accurately determining the transmission quality of a signal by a base station to a cellular phone.

In the literature concerning signal processing (for example Proakis: Digital Communications, pages 270-271, e.g., FIG. 4.2.19), there is found a relation between the BER and the signal-to-noise ratio (S/N ratio) which unexpectedly provides a suitable basis to achieve the object of the invention.

The invention is characterized in that the mobile station a) determines the phase error of detected bits at the input of the channel decoder, b) calculates the average and variance of the phase error, c) calculates the S/N ratio of the received signal using the average and variance values, and d) transmits information on the calculation result to the base station, whereby the calculated ed S/N ratio is converted to a value defining the BER estimate of the received signal, the BER defining the transmission quality.

According to one embodiment of the present invention, the S/N ratio is calculated individually for each training sequence, which is predetermined by the transmission method, and the transmitted measurement information is the average of a predefined number of individual calculation results. In a preferred embodiment, the S/N to BER conversion is performed by an algorithm stored in the mobile station, and the mobile station transmits the estimated BER to the base station.

The invention is described in more detail below by an example concerning the U.S. digital cellular radio telephone system (USDIG), which is described in various specifications. The specifications relating to the present invention are IS-54 and IS-55.

The USDIG system utilizes a pi/4 DQPSK (Differential Quadrature Phase Shift Keying) modulation method. This system defines the mobile assisted handoff bit error rate as an estimate of bit error rate information which is obtained by monitoring the correctness of the data stream input to the channel decoder on the current traffic channel. The estimated BER is reported by the mobile station in the channel quality message, and this measurement shall not differ from the actual bit error rate more than 25% over ten reporting periods, corresponding to a total period of 250 frames (IS-55).

In the prior art it is assumed that the mobile station determines the BER of the received data by monitoring the correctness of the received bit stream at the input to the channel decoder. According to the specification the BER is calculated for 25 frames by estimating the number of bit errors and by dividing this number by the number of transmitted bits (8900 bits received in 25 frames, or more exactly=2 slots/frame * 25 frames * 178 coded class 1 bits). The prior art assumes that the mobile station will convert the average BER value to a three bit number which is transmitted to the base station. The values define a BER range between 10% and 0.0075%.

According to the present invention, the BER is estimated by calculating the S/N ratio. The above mentioned BER range corresponds to a S/N range of about 1 dB to 11 dB. The S/N ratio is calculated by counting the average and variance of the phase deviation of received bits.

The phase error can be determined by measuring the difference between the phase change between two consecutive symbols and the expected phase change (the phase must be 45, 135, −135 or −45 degrees; the correct expected phase is determined during the training sequence). If the difference equals the expected value, then both bits receive a defined maximum value as the phase error (x). If the phase differs 45 degrees from the expected amount, then one bit gets the phase error value of zero and the other bit the maximum value. In other words, this means that the other bit is exactly known or correctly detected, but the value of the one bit is either '0' or '1'. If the measured difference is 90 degrees, then the other bit has a maximum value, but the one bit now gets a maximum minus value, i.e., indicating that there is an error in the detection of this one bit. Both bits get the maximum minus value if the measured phase difference is 180 degrees, i.e., neither bit is correctly detected. In practice a good estimate of the phase error is achieved when the phase changes are represented by a cos-function.

From the determined phase error values x, the average is calculated: $m + E(x)$.

Then the corresponding signal power level $+ m^2 = (m * m)$. The noise power level $s^2$ is obtained by the formula:

$$s^2 + E(x^2) - (E(x))^2$$

From this we then can calculate the S/N ratio (SNR):

$$SNR = m^2/s^2 \qquad (1)$$

(or as expressed in decibels: $=10 * \log(SNR)$).

Now we have a value for the S/N ratio which easily can be used to calculate the bit error rate according to Proakis, p. 271:

$$BER = Q(a,b) - 0.5 * I_0(a*b) * \exp(-0.5(a^2+b^2)) \quad (2)$$

where
$a = \sqrt{(2 * SNR * (1-s2)}$
$b = \sqrt{(2 * SNR * (1+s2)}$
$Q(a,b) =$ Marcum's Q-function
$I_0(x) =$ the modified Bessel function of order zero,
and where $$s2 = 1/\sqrt{2}.$$

A good approximation of (2) is the following formula:

$$BER = 0.17492 * \exp(0.60619*SNR + 0.60362/SNR) \quad (3)$$

For practical realizations it is convenient to measure S/N ratios and the corresponding BER values in well defined conditions and to store these measured value pairs in a look-up table (read only memory). During operation, a BER value is obtained as a look-up operation with linear interpolation. As a rough estimate a table comprising 64 values of 16 bits would be sufficient. The look-up table is designed individually for systems using different modulation methods.

According to the present invention, the mobile station measures the S/N ratio for a predetermined number of frames, according to the appropriate specification for 25 frames. Approximately 60 multiplications and 120 additions are required for each frame. Further the SNR and BER have to be calculated for every 25th frame. The average value is preferably calculated as a moving average.

In practice the present invention may be performed on a complete frame. According to our simulations this provides only fair values. In some cases the estimated value contains an error below 1%, but in the worse cases the error rises dramatically. The results indicate a good compatibility with the channel quality classification.

A more effective and preferred method according to the invention is performed for the training sequence of each frame only. The training sequence is well known in each case. This method sequence is well known in each case. This method provides excellent results, except in cases where the S/N ratio is extremely poor, because the simplified formula )3) in these cases could cause an error of up to 5%.

The invention is not limited to the use of the formula (3). Thus, it is appreciated that considerable modifications and refinements are possible, in order to provide more exact measurement results, if required. In the same manner it is possible to use a more sophisticated measurement/calculation algorithm is order to determine the phase error values. The advantages of the described system is, however, that it presents a simple and reliable method for implementation in mobile stations.

It is possible to have the BER calculation performed in the base station so that the mobile station transmits only the S/R ratio information to the base station. However, the described method presents no obstacles to implement the BER calculation in a mobile station, which is the preferred method.

We claim:

1. A method for determining the transmission quality of a signal transmitted by a base station and received by a cellular digital radio telephone network mobile station having a channel decoder, comprising the steps of:
    using the channel decoder to detect digital bits in the signal and produce a received bit signal;
    producing a phase error signal related to the phase error of the detected bits in the received bit signal;
    calculating an average and variance of the phase error signal;
    generating a signal-to-nose (S/N) ratio signal of the received signal based on the average and variance values; and
    comparing the S/N ratio signal to values stored in a read-only-memory, the stored values defining a bit error rate (BER) estimate of the received signal, the BER estimate defining the transmission quality.

2. The method of claim 1 further including the step of transmitting information regarding the S/N ratio calculation to the base station prior to the step of converting.

3. The method of claim 2, wherein the steps of calculating the S/N ratio and converting the transmitted S/N ratio information to a BER value are modified for different mobile telephone systems to take into account a modulation method used in each system.

4. The method of claims 1, 2, or 3, wherein the step of calculating the S/N ratio is performed individually during a training sequence, said training sequence being predetermined by a transmission method for a mobile telephone system, and the S/N ratio calculation information is an average of a predetermined number of individual calculation results.

5. The method of claim 1, wherein the converting step is performed by interpolating a value found in a look-up table.

6. The method of claim 1, wherein the converting step is performed by an algorithm stored in the mobile station.

7. The method of claim 2, wherein the transmitting step is performed by the mobile station.

8. The method of claim 1, wherein the step of calculating the S/N ratio is performed on a training sequence of 25 frames, and that a S/N calculation average is calculated as a moving average.

9. The method of claim 1, wherein the BER estimate is used to control hand-off of the mobile station to another base station.

10. The method of claim 1, wherein the method is used in the digital US cellular radio telephone network.

11. The method of claim 1, wherein the step of calculating the signal-to-noise (S/N) ratio is arrived at according to the Proakis algorithm.

* * * * *